(12) United States Patent
Dollar

(10) Patent No.: US 11,318,634 B2
(45) Date of Patent: May 3, 2022

(54) WINDSHIELD WIPER CUTTER

(71) Applicant: Joel Dollar, Grapevine, TX (US)

(72) Inventor: Joel Dollar, Grapevine, TX (US)

( * ) Notice: Subject to any disclaimer, the term of this patent is extended or adjusted under 35 U.S.C. 154(b) by 0 days.

(21) Appl. No.: 16/836,564

(22) Filed: Mar. 31, 2020

(65) Prior Publication Data
US 2020/0368930 A1     Nov. 26, 2020

Related U.S. Application Data

(60) Provisional application No. 62/850,318, filed on May 20, 2019.

(51) Int. Cl.
| | | |
|---|---|---|
| *B26B 29/06* | (2006.01) | |
| *B26B 5/00* | (2006.01) | |
| *B25G 1/10* | (2006.01) | |
| *B60S 1/38* | (2006.01) | |
| *B26B 25/00* | (2006.01) | |

(52) U.S. Cl.
CPC .............. *B26B 29/06* (2013.01); *B25G 1/102* (2013.01); *B26B 5/00* (2013.01); *B60S 1/38* (2013.01); *B26B 5/006* (2013.01); *B26B 25/005* (2013.01); *B60S 2001/3846* (2013.01)

(58) Field of Classification Search
CPC .... B60S 1/38; B60S 2001/3846; B26G 1/102; B26B 29/06; B26B 25/005; B26B 5/006; B26B 5/00
See application file for complete search history.

(56) References Cited

U.S. PATENT DOCUMENTS

| | | | | |
|---|---|---|---|---|
| 2,973,577 | A * | 3/1961 | Schekowski | B60S 1/38 30/272.1 |
| 3,611,571 | A * | 10/1971 | Belling | H02G 1/02 30/280 |
| 3,670,459 | A * | 6/1972 | Welton | B24D 15/00 451/461 |
| 4,604,802 | A * | 8/1986 | Samuelsson | B26D 3/28 269/157 |
| 5,208,984 | A * | 5/1993 | Negus | A47L 13/08 15/236.01 |
| 5,251,351 | A * | 10/1993 | Klotz | A47L 1/08 7/100 |
| 5,848,471 | A * | 12/1998 | Freeland | B26D 3/003 30/280 |

(Continued)

*Primary Examiner* — Evan H MacFarlane
*Assistant Examiner* — Fernando A Ayala
(74) *Attorney, Agent, or Firm* — My Patent Guys; Christopher Pilling; Johan Eide

(57) ABSTRACT

The present invention relates to a windshield wiper cutter for removing a portion of a blade of a windshield wiper. The windshield wiper cutter allows the user to manually engage a windshield wiper cutter along a linear path and across at least one cutter to remove a portion of the blade of a windshield wiper. In doing so, an old, uneven or damaged blade can be repurposed for future use by removing only the old, uneven or damaged portions of the blade and leaving the remaining portions of the blade intact. In the process of removing only a specific portion of the blade, the inside of the blade is now exposed and a new edge is formed. The new edge comprising a previously unused portion of the blade that effectively disperses debris and water from the windshield of a vehicle.

4 Claims, 9 Drawing Sheets

(56) References Cited

U.S. PATENT DOCUMENTS

| | | | | |
|---|---|---|---|---|
| 5,853,257 | A * | 12/1998 | Dubroy | A47L 1/08 |
| | | | | 401/17 |
| 7,690,120 | B2 * | 4/2010 | Sieke | B60S 1/38 |
| | | | | 30/293 |
| 10,173,335 | B2 * | 1/2019 | Oven | B26D 7/2628 |
| 2001/0034919 | A1 * | 11/2001 | Faggiotto | B60S 1/38 |
| | | | | 15/236.06 |
| 2003/0141622 | A1 * | 7/2003 | Winters | B60S 1/38 |
| | | | | 264/138 |
| 2006/0179664 | A1 * | 8/2006 | Butler | B26D 3/28 |
| | | | | 30/294 |
| 2009/0158545 | A1 * | 6/2009 | Grasso | B60S 1/3881 |
| | | | | 15/250.001 |
| 2012/0304469 | A1 * | 12/2012 | Powell | B26B 29/025 |
| | | | | 30/143 |
| 2018/0333883 | A1 * | 11/2018 | Richter | B26D 1/02 |

* cited by examiner

WINDSHIELD WIPER CUTTER

CROSS-REFERENCE TO RELATED APPLICATIONS

The present invention claims priority to provisional application Ser. No. 62/850,318 entitled "Windshield Wiper Cutter" filed May 20, 2019, the disclosure of which is hereby incorporated in its entirety at least by reference.

BACKGROUND

1. Field of the Invention

The present invention relates to a windshield wiper cutter for cutting a windshield wiper.

2. Description of Related Art

Visibility is a critical aspect of any transportation vehicle. If a user can not see where the transportation vehicle is currently or where the transportation vehicle is headed, the safety of the user and those around the user is greatly impaired. A blade of a windshield wiper is commonly made of rubber and other pliable composite materials. Materials such as rubber and other pliable materials are known to lose elasticity or to become pitted when exposed to sunlight and ambient environments for an extended period of time. When the elasticity of windshield wipers is lost or when the blade becomes pitted, the blade commonly loses even contact with the windshield of the transportation vehicle. In doing so, biological matter, dust or water is unevenly dispersed from the vision of the user operating the transportation vehicle.

Secondly, windshield wipers are often made for a single period of use and are often disposed of after the blade of the wiper becomes brittle, pitted or loses elasticity. Debris and biological matter accumulated upon the windshield of a transportation vehicle can also cause further damage to an edge of the blade of the windshield wiper or the windshield itself after repetitive use. The edge of a windshield wiper blade is critical in effectively removing water and debris from a windshield. Many windshield wipers are also not made in a size universal to multiple vehicles of different make or models. The specificity of windshield wiper designs made to match the specific shape of a transportation vehicles results in the user not wanting to spend the time lookup the proper size for their vehicle or to take the time to travel to buy the proper windshield wiper size. As a result, commonly many windshield wipers are prematurely disposed of or used beyond the viable life of the blade.

A solution is needed for allowing the user to prolong the viable life of the blade of a windshield wiper without buying a new windshield wiper.

SUMMARY

The present invention relates to a windshield wiper cutter for removing a portion of a blade of a windshield wiper. The windshield wiper cutter allows the user to manually engage a windshield wiper cutter along a linear path and across at least one cutter to remove a portion of the blade of the windshield wiper. In doing so, an old, uneven or damaged blade can be repurposed for future use by removing only the old, uneven or damaged portions of the blade and leaving the remaining portions of the blade intact. In the process of removing only a specific portion of the blade, the inside of the blade is now exposed and a new edge is formed. The new edge comprising a previously unused portion of the blade that effectively disperses debris and water from the windshield of a vehicle.

One object of the present invention is to provide a windshield wiper cutter that is portable and easily stored by the user.

Another object of the present invention is to increase the ease of use by the user. This is accomplished by designing the main body of the windshield wiper cutter to be easily grasped by the hand of a user during operation, therein the main body is easily pushed or pulled across the blade of the windshield wiper Another object of the present invention is to provide a windshield wiper cutter that is adaptable for cutting multiple articles having a rubber or elastic material strip or blade, such as squeegees or a kitchen utensil.

In order to do so, a windshield wiper cutter is provided having a main body having a top surface, a bottom surface, and a perimeter edge. The perimeter edge is held by a hand of a human, in some embodiments with the aid of an external texture. Next, at least one guide slot is configured to guide the blade in a linear path across the main body when manually engaged by the user. At least one cutter is positioned at a predetermined angle relative to the top surface of the main body and protrudes into the at least one guide slot. In doing so, the cutter contacts the blade of the windshield wiper as the windshield wiper is moved along the linear path. On the bottom surface of the windshield wiper cutter a first opening is connected to the at least one guide slot, when cutting a blade of a windshield wiper the first opening allows for a portion of the blade, removed by the at least one cutter, to exit the main body.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Figure 1:
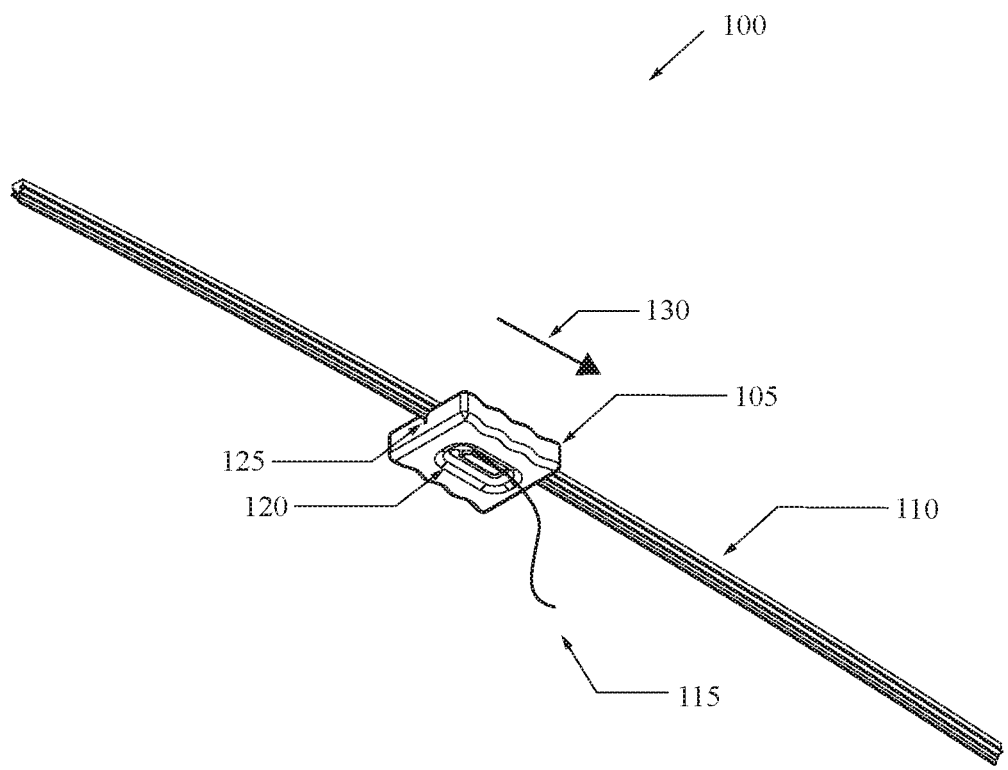
FIG. 1 shows an exemplary perspective view of one embodiment of the windshield wiper cutter.
Figure 2:
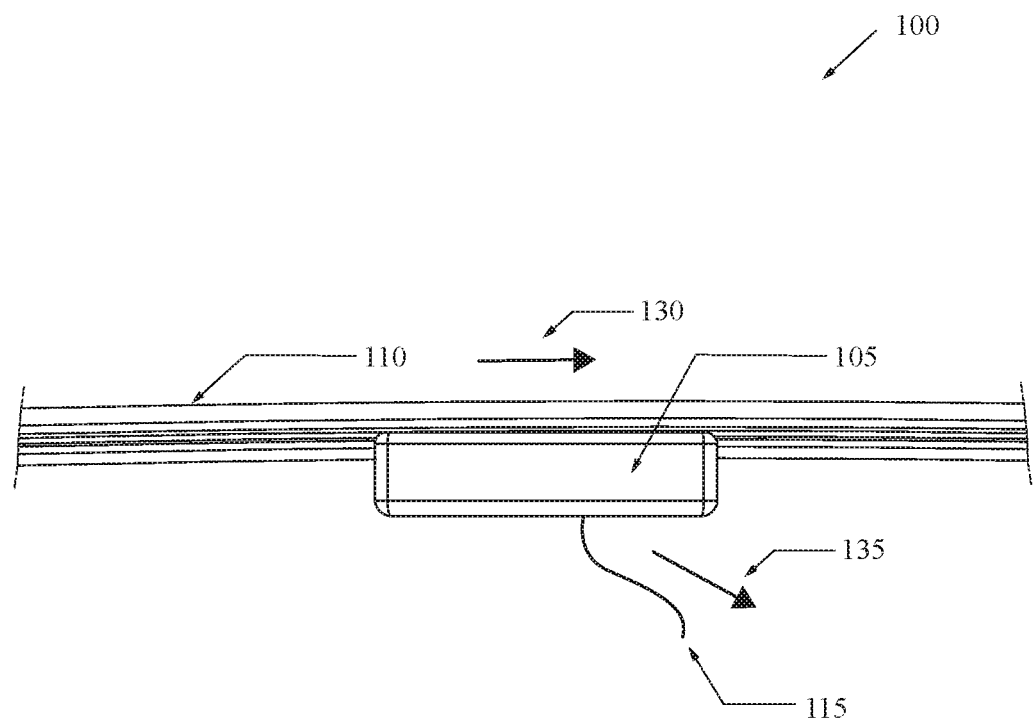
FIG. 2 shows an exemplary right view of one embodiment of the windshield wiper cutter.
Figure 4:
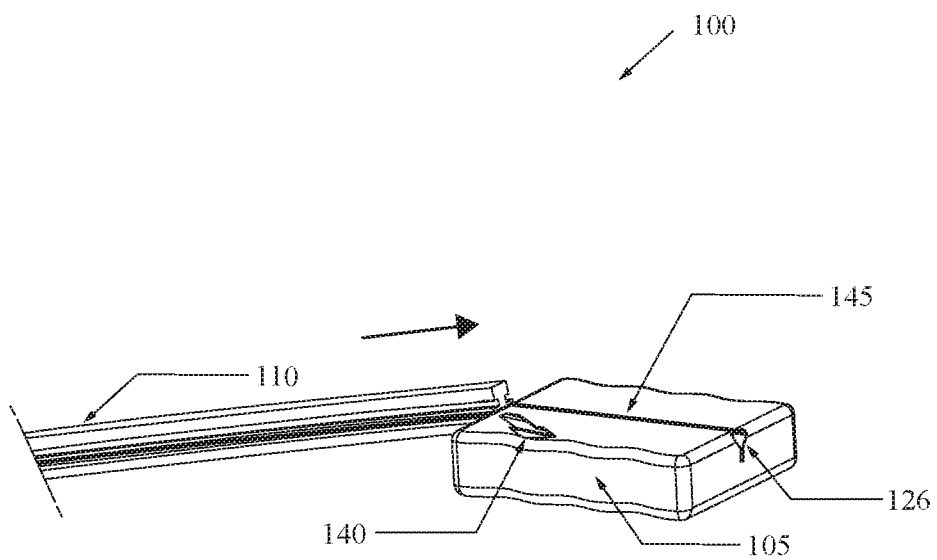
FIG. 4 shows an exemplary perspective view of one embodiment of the windshield wiper cutter.

FIGS. 1, 2 and 4 illustrate a windshield wiper cutter 100 for cutting a blade 110 of a windshield wiper. A main body 105 having a top surface, a bottom surface, and a perimeter edge that is held by a hand of a human in use. The windshield wiper cutter 100 includes a guide slot 145 configured to guide the wiper blade 110 in a linear path traveling in a first direction 130 across the main body 105. At least one cutting element 150 is positioned at a predetermined angle relative to the top surface and/or perimeter edge of the main body 105 within the main body 105. In one embodiment, the at least one cutting element 150 rests within the main body 105 and contacts the blade 110 of the windshield wiper as the windshield wiper is moved along the linear path in the first direction 130. In some embodiments, the windshield wiper cutter 100 includes at least one of guide slot 145. In one embodiment, the guide slot 145 includes an inlet 125 and an outlet 126. The cross-sectional shape of the inlet 125 and/or the outlet 126 is configured to match the cross-sectional shape of the wiper blade 110 to be cut by the windshield wiper cutter 100. Those skilled in the art will recognize that the cross-sectional shape of the inlet 125 and/or the outlet 126 may comprise a universal cross-sectional shape adapted to fit multiple blades of different brands or models of windshield wipers. In other embodiments, the windshield wiper cutter 100 includes multiple guide slots 145 having different cross-sectional shapes of different sizes of windshield wipers and within the main body 105.

Disposed centrally upon the bottom surface of the main body 105 a first opening 120 is arranged extending into the main body 105. The first opening 120 is in fluid connection with the guide slot 145. This connection allows for a portion 115 of the blade 110 removed by the at least one cutting element 150 to exit the main body 105. The first opening 120 may be rounded or radiused to aid in directing the portion 115 of the wiper blade 110 in a second direction 135 during removal. The first opening 120 also allowing the user to visibly confirm that the at least one cutting element 150 has been properly installed within the main body 105.

In some embodiments, the at least one cutting element 150 is chosen from a cutting set, by way of non-limiting example, comprising: a razor blade 110, a knife, a member of a multi-tool, a pocket knife, and a bladed disc. The main body 105 of the windshield wiper cutter 100, in some embodiments, further comprises an external texture to aid in gripping the hand of the human. The external texture may further comprise at least one member of a texture set consisting of: indentations, extrusions, knurling, a rough surface, and bumps. The indentations of the texture set may comprise a shape designed to engage at least one finger of a human hand during the use of the windshield wiper cutter 100.

Figure 5A:
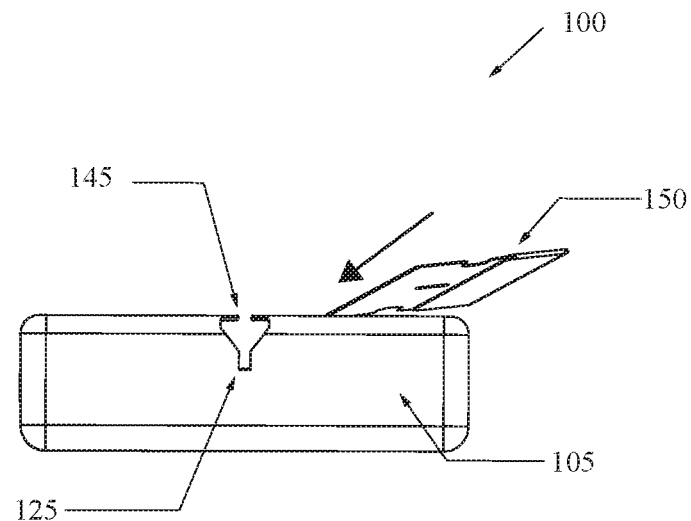
FIG. 5A shows an exemplary front view of one embodiment of the windshield wiper cutter.
Figure 5B:
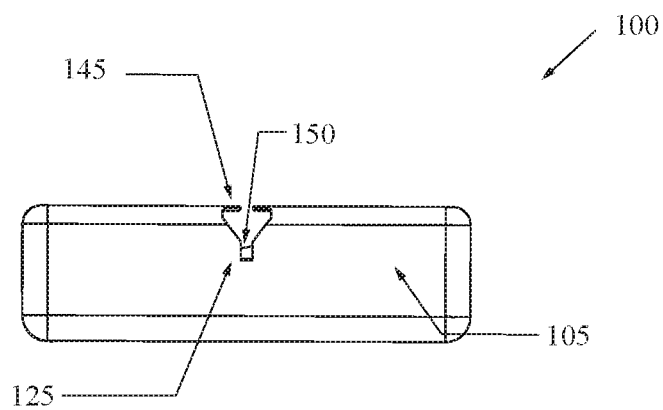
FIG. 5B shows an exemplary front view of one embodiment of the windshield wiper cutter.
Figure 6:
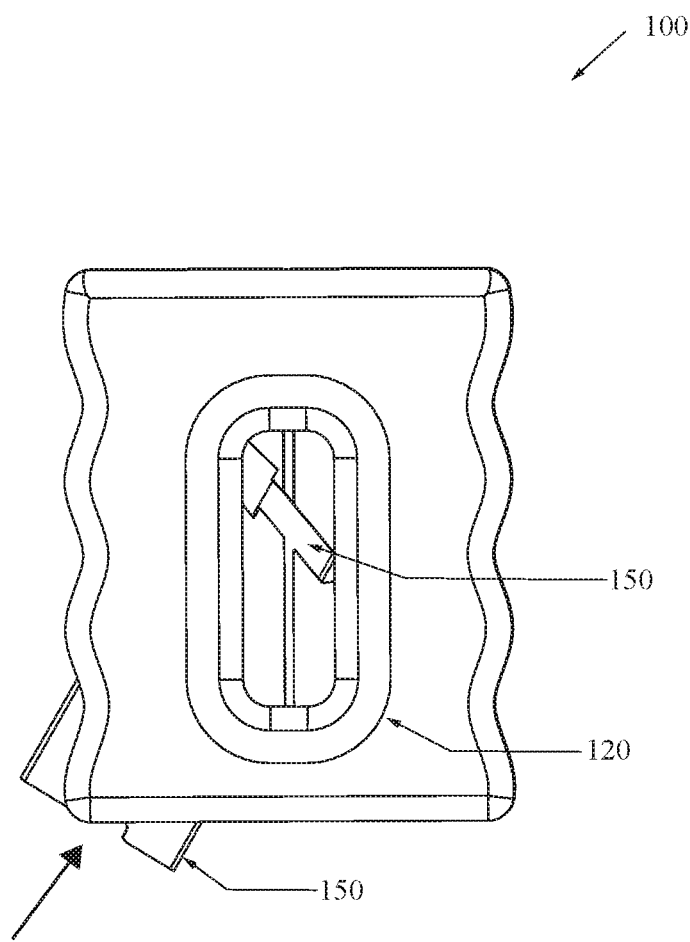
FIG. 6 shows an exemplary bottom view of one embodiment of the windshield wiper cutter.
Figure 7:
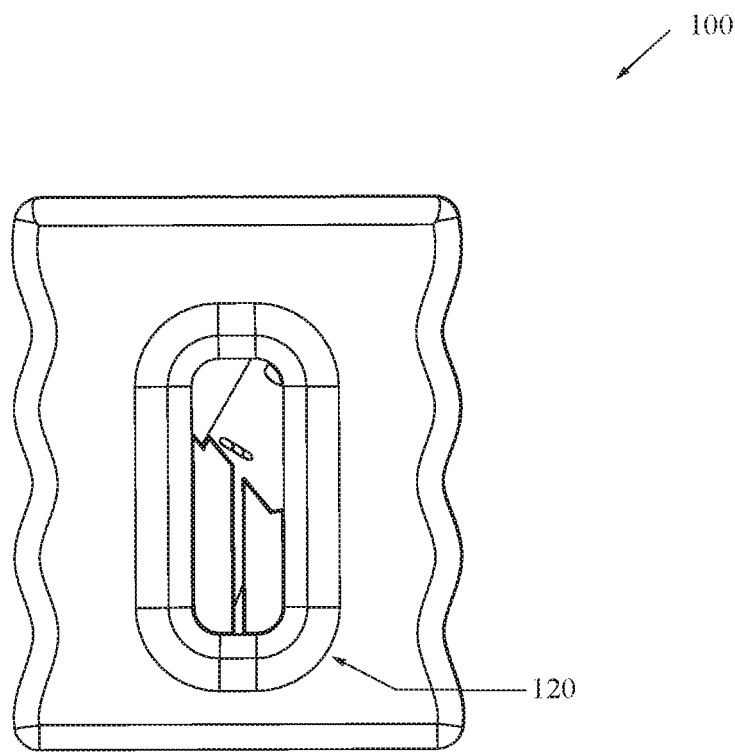
FIG. 7 shows an exemplary bottom view of one embodiment of the windshield wiper cutter.

As shown in FIGS. 3, 5A, 5B, 6 and 7 the main body 105 of the windshield wiper cutter 100 includes an angled indentation 140 extending into the main body 105 and extending through the guide slot 145. The angled indentation 140 configured to receive the at least one cutting element 150. The at least one cutting element 150, as shown in FIG. 5B, is designed to partially rest protruding into the guide slot 145 when fully inserted. In embodiments having more than one of the guide slot 145, the angled indentation 140 may extend through at least one of the guide slots 145.

Figure 3:
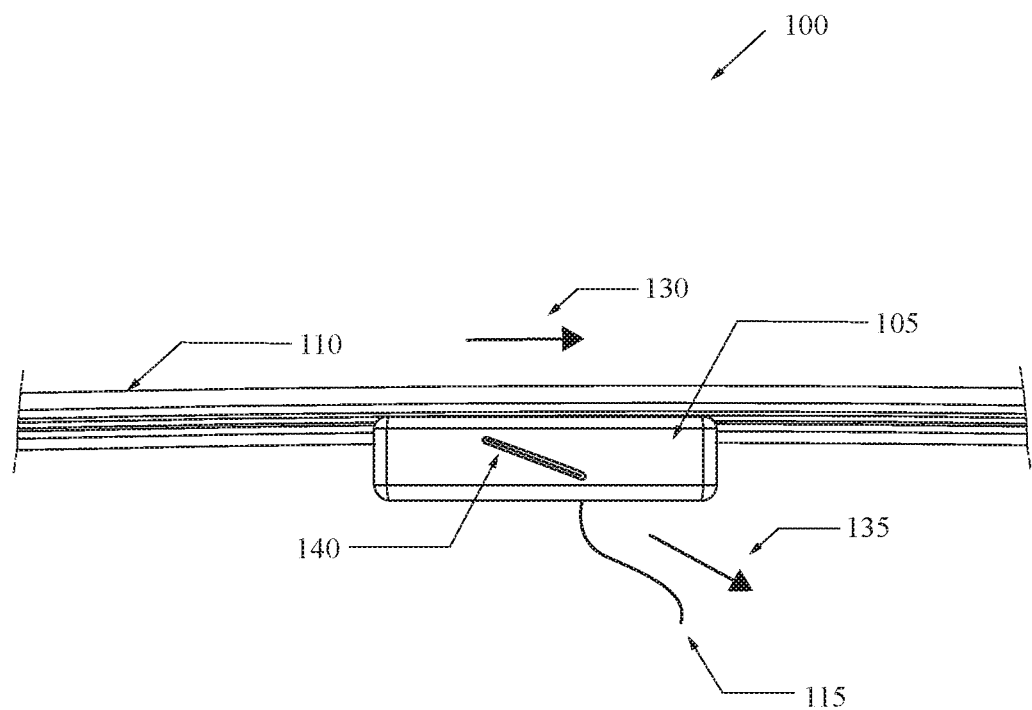
FIG. 3 shows an exemplary right view of one embodiment of the windshield wiper cutter.

The angled indentation in FIG. 3 is shown extending through the perimeter edge of the main body 105. FIG. 5A and FIG. 5B illustrates an embodiment wherein the angled indention protrudes through and into the top surface of the main body 105. The angled indentation 140 may extend and be arranged on any surface of the main body 105. The predetermined angle of the angled indentation may be directly proportional to a size of the portion 115 removed from the blade 110 of the windshield wiper. The angled indention may also be configured to further comprise a snap-fit or a tapered fit, wherein at least one cutting element 150 is held in a final position once fully inserted into the angled indentation 140. The angled indentation 140 in the preferred embodiment is held in a fixed position. In other embodiments, angled indentation 140 is configurable and adjustable by the user as desired. In some embodiments, the main body 105 is made of at least one material of a material set, by way of non-limiting example consisting of: metal, a rubber, a plastic, a wood, a foam, a fabric or any combination thereof. In some embodiments, the angled protrusion 140 is co-planer with a parting line of a mold of the main body for use during manufacturing. The parting line of the mold being arranged at the predetermine angle and diving the main body into a first half and a second half (not shown). The first half is then adjoined to the second half during assembly and the at least one cutting element 150 is held therebetween. In embodiments having more than one guide slot 145, at least one guide slot 145 may further comprise a brush or a cleaning member for cleaning the blade 110 of a windshield wiper. The user of the present invention, as recognizable by one skilled in the art, can use the present invention with many rubber or elastic articles other than windshield wipers including, by way of non-limiting example, a squeegee, a gasket, a garage door seal, and a kitchen utensil.

In exemplary operation, the blade 110 of a windshield wiper is first manually fed through the inlet 125 and into the guide slot 145 of the main body 105, as shown in FIG. 4. Once the blade 110 of the windshield wiper has started to move along the linear path of the guide slot 145 in the first direction 130, the blade 110 contacts the at least one cutting element 150 partially protruding into the guide slot 145 between the inlet 125 and the outlet 126. The at least one cutting element 150 then removes the portion 115 of the blade 110 as the blade 110 of the windshield wiper is fed across the at least one cutting element 150. The portion of the blade 110 removed then exits the main body 105 through the first opening 120 in a second direction. The blade 110 finally exiting through the outlet 126 when a full length of the blade 110 has had the portion 115 of the blade 110 removed. In doing so, an old, uneven or damaged windshield wiper blades can be re-purposed for future use by removing only the old, uneven or damaged portions of the blade 110 and leaving a remain portion of the blade 110 intact. In the process of removing only the old, uneven or damaged portions of the blade 110, the inside of the blade 110 is now exposed and a new edge is formed. The new edge comprising a previously unused portion of the blade 110 that effectively disperses debris and water from the windshield of a vehicle.

Figure 8:
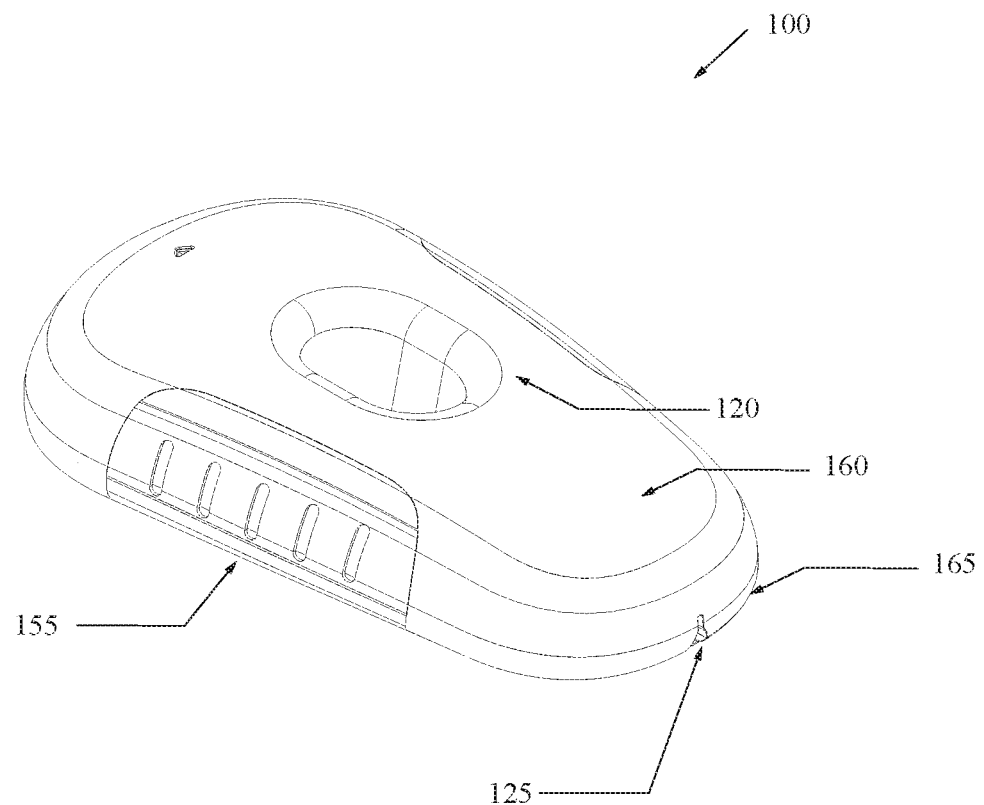
FIG. 8 shows an exemplary prospective view of an alternative embodiment of the windshield wiper cutter.
Figure 9:
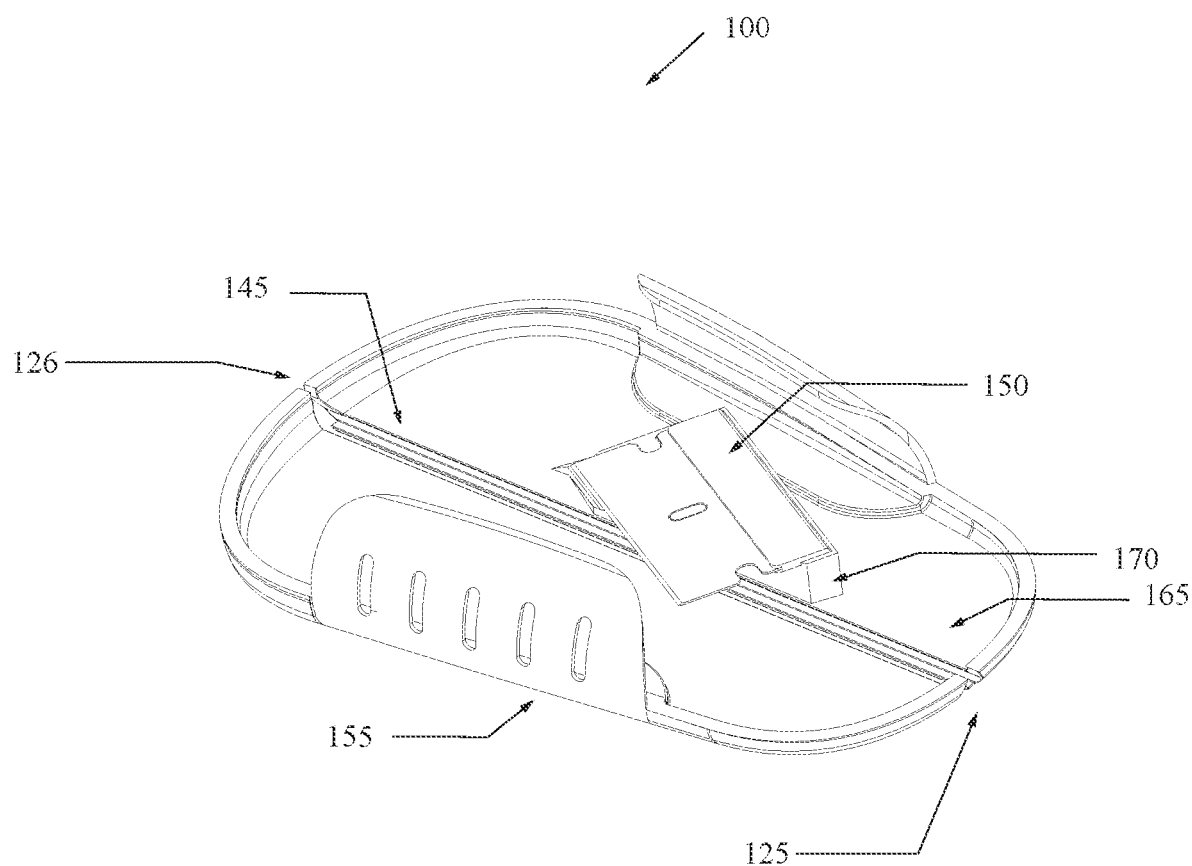
FIG. 9 shows an exemplary prospective view with a portion of the main body removed to expose the at least one cutter positioned at an angle in the main body according to an alternative embodiment of the present invention.

Referring now to FIGS. 8 and 9 an alternative embodiment of a windshield wiper cutter 100 is provided. The function and operation of the alternative embodiment is similar. The alternative windshield wiper cutter 100 features an ergonomic main body 105 having a perimeter edge with grips 155 or external texture to configure to aid in gripping the hand of the human during use. As previously discussed, the main body 105 includes a first opening 120 disposed centrally upon the bottom surface of the main body 105, as well as at least one guide slot 145 having an inlet 125 and an outlet 126. The advantage of the alternative embodiment, is that at least one cutting element 150 is protected inside the main body 105. In one embodiment, a piece of the main body is removable (as seen in FIG. 9) allowing a user to access the at least one cutting element 150 for installation or replacement when necessary. The main body having a top piece 160 and a bottom piece 165. During assembly, at least one cutting element 150 is positioned upon a cutting element platform 170 positioned upon the bottom piece 165. Next, the top piece 160 of the main body is adjoined to the bottom piece 165 and in doing so, secures the at least one cutting element 150 upon the cutting element platform 170 between the top piece 160 and the bottom piece 165. As previously discussed, the at least one cutting element 150 is at a predetermined-angle in relation to the perimeter edge and/or a surface of the main body 105. In short, the at least one cutting element 150 is in a three-dimensional angle when positioned in the main body.

In some embodiments, the main body 105 further comprises at least one member of an identification set consisting of: an alphanumeric identification, a human user's name, a symbolic shape, a company brand, a numeric identification number, a QR code, a barcode, and an RFID tag. For example, a member of the identification set may aid the user in identifying the brand of a windshield wiper having the cross-sectional shape of the guide slot 145.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 0%, 5%, or 10%, including increments therein.

Unless otherwise defined, all technical terms used herein have the same meaning as commonly understood by one of ordinary skill in the art to which this disclosure belongs.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, 116.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A windshield wiper cutter, for cutting a wiper blade of a windshield wiper, the windshield wiper cutter comprising:
a main body having a first piece, second piece, and a perimeter edge, wherein the second piece is opposite of the first piece;
a guide slot having an inlet and an outlet positioned at opposite ends of the second piece such that the guide slot extends longitudinally through the second piece, wherein the guide slot is configured to guide the wiper blade in a linear path across the second piece of the main body;
a razor blade positioned and secured between the first piece and the second piece, wherein the razor blade contacts the windshield wiper as the windshield wiper is moved along the linear path; and
an opening extending through the first piece of the main body, wherein the opening extends perpendicularly to the guide slot and is connected to the guide slot such that the opening allows for a portion of the wiper blade removed by the razor blade to exit the first piece of the main body obliquely from the razor bade.

2. The windshield wiper cutter of claim 1, wherein the perimeter edge further comprises an external texture.

3. A windshield wiper cutter, for cutting a wiper blade of a windshield wiper, the windshield wiper cutter comprising:
a main body having a top side, a bottom side, a front side, a rear side, a left side, and a right side,
a guide slot having an inlet and an outlet positioned at opposite ends of the main body on the front side and the rear side respectively, the guide slot extending longitudinally through the top side of the main body, wherein the guide slot is configured to guide the wiper blade in a linear path across the main body;
an indentation extending through the right side of the main body and connecting to the guide slot,
a razor blade positioned within the indentation, wherein the razor blade contacts the windshield wiper as the windshield wiper is moved along the linear path; and an opening extending through the bottom side of the main body, wherein the opening extends perpendicularly to the guide slot and is connected to the guide slot such that the opening allows for a portion of the wiper blade removed by the razor blade to exit the bottom side of the main body.

4. The windshield wiper cutter of claim 3, wherein the indentation is angled relative to the linear path.

\* \* \* \* \*